United States Patent [19]

Schwartz et al.

[11] 3,963,066

[45] June 15, 1976

[54] REVERSIBLE REPLACEABLE TREAD TIRE

[76] Inventors: Kenneth P. Schwartz, 2604 N. Emerald Drive, Fairborn, Ohio 45324; Paul M. Wagner, 2268 Andrew Road, Dayton, Ohio 45440

[22] Filed: Mar. 25, 1975

[21] Appl. No.: 561,768

[52] U.S. Cl. ........................... 152/187; 152/209 R; 152/361 R
[51] Int. Cl.² ..................... B60C 11/02; B60C 9/18
[58] Field of Search ............ 152/185, 187, 188–191, 152/170–172, 175–179, 182–184, 209 R, 330 R, 353 R, 361 R

[56] References Cited
UNITED STATES PATENTS

| | | | |
|---|---|---|---|
| 1,897,974 | 2/1933 | Wolf | 152/188 |
| 3,578,052 | 5/1971 | Petersons | 152/187 |

*Primary Examiner*—Drayton E. Hoffman
*Attorney, Agent, or Firm*—Joseph E. Rusz; Arthur R. Parker

[57] ABSTRACT

A pneumatic carcass tire having a replaceable tread belt modified by being molded with dual tread patterns of different configurations disposed on the outside and inside surfaces thereof to enable the more efficient and compatible use of the tread belt in alternate, reversible manner for different ground surface and prevailing weather conditions.

1 Claim, 7 Drawing Figures

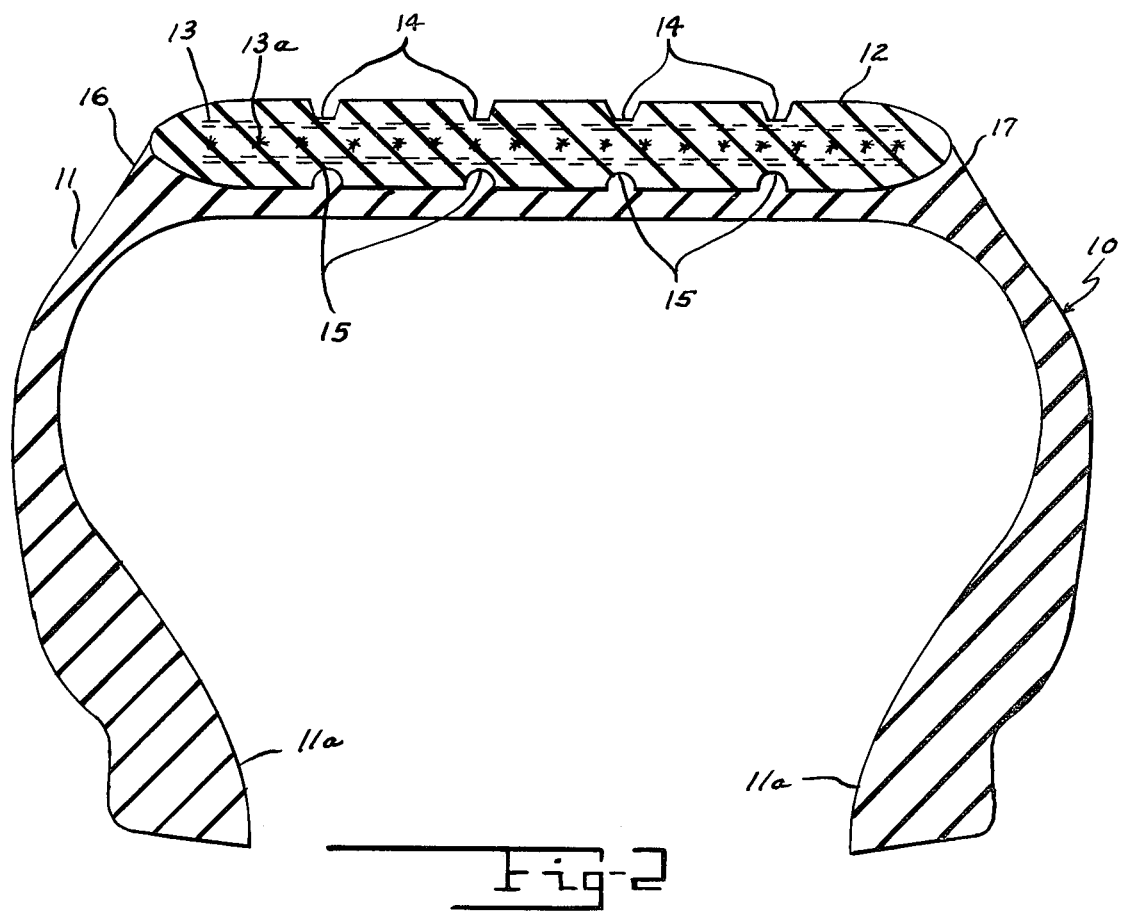
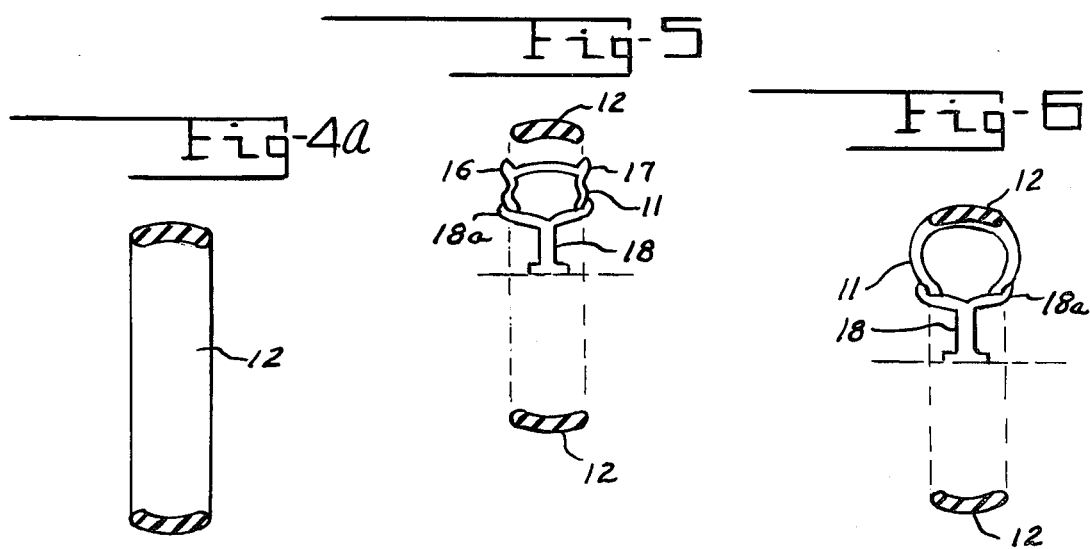

REVERSIBLE REPLACEABLE TREAD TIRE

RIGHTS OF THE GOVERNMENT

The invention described herein may be manufactured and used by or for the Government of the United States for all governmental purposes without the payment of any royalty.

BACKGROUND OF THE INVENTION

This invention relates to an improved replaceable tread belt-pneumatic carcass tire.

Before the advent of the replaceable tread belt tire, it was naturally necessary that, in the event of dangerous tread cuts, badly worn treads or spots and other damage to the tread, the entire tire had to be removed from the vehicular wheel. Its replacement was, of course, with either a brand new tire or the removed tire had to be sent to a specially equipped shop for the recapping thereof or replacement with another recapped tire. Subsequently, the replaceable tread belt tire was developed, which tire obviously would enable the removal of just the worn-out or damaged tread portion per se with its replacement with a new tread belt only. The considerable savings in time and expense that is offered by the use of the replaceable tread belt is self-evident since, so long as the tire carcass remains in satisfactory condition, the replaceable tread belt can be replaced over and over again. An example of the aforementioned replaceable tread-pneumatic carcass tire is illustrated in U.S. Pat. No. 3,578,052, issued to A. V. Petersons on May 11, 1971.

The present invention offers a unique advantage over, and constitutes an improvement of the previously developed replaceable tread-pneumatic carcass tire in a manner and by new, novel and yet relatively simplified means to be set forth in detail in the following summary and detailed description thereof.

SUMMARY OF THE INVENTION

The present invention consists in a new and novel combination comprised of a pneumatic tire carcass combined with a replaceable tread that is considered to be improved over other replaceable tread tires by being molded with different tread patterns on both the outside and inside surfaces thereof. In this connection, although the broad use of multiple tread portions on a replaceable tread tire has already been taught, as is specifically disclosed in FIG. 5 of U.S. Pat. No. 1,897,974, issued to G. Wolf on Feb. 14, 1933, the improvement taught by the present invention resides in a replaceable tread that is molded with "different" tread patterns on its outside and inside surfaces that would be specifically compatible with different ground surface and/or prevailing weather conditions. Thus, with the present arrangement, the vehicle operator or aircraft ground crew can, unlike the tread disclosed in U.S. Pat. No. 1,897,974, select and then employ the particular tread surface most suitable to the specific ground surface over which the vehicle is to be operated, or, alternatively, to be specifically accommodated to the prevailing weather conditions, which may consist of snow and ice, simply either by reversing the outer surface of the tread belt of the present invention to its inner surface or vice versa whichever is most appropriate.

Additional objects and/or advantages of this invention will readily appear hereinafter from the following disclosure, taken in connection with the accompanying drawings in which:

BRIEF DESCRIPTION OF THE DRAWINGS

FIGS. 1 and 2 respectively represent somewhat schematic, cross-sectional views of the novel reversible, replaceable tire tread of the present invention shown with the tire carcass thereof in both deflated and inflated conditions; and FIGS. 3–6, inclusive, respectively depict the various steps involved in the procedure for mounting the reversible, replaceable tire tread of the invention on an expandable pneumatic tire carcass.

DESCRIPTION OF THE PREFERRED EMBODIMENT

Figure 1:
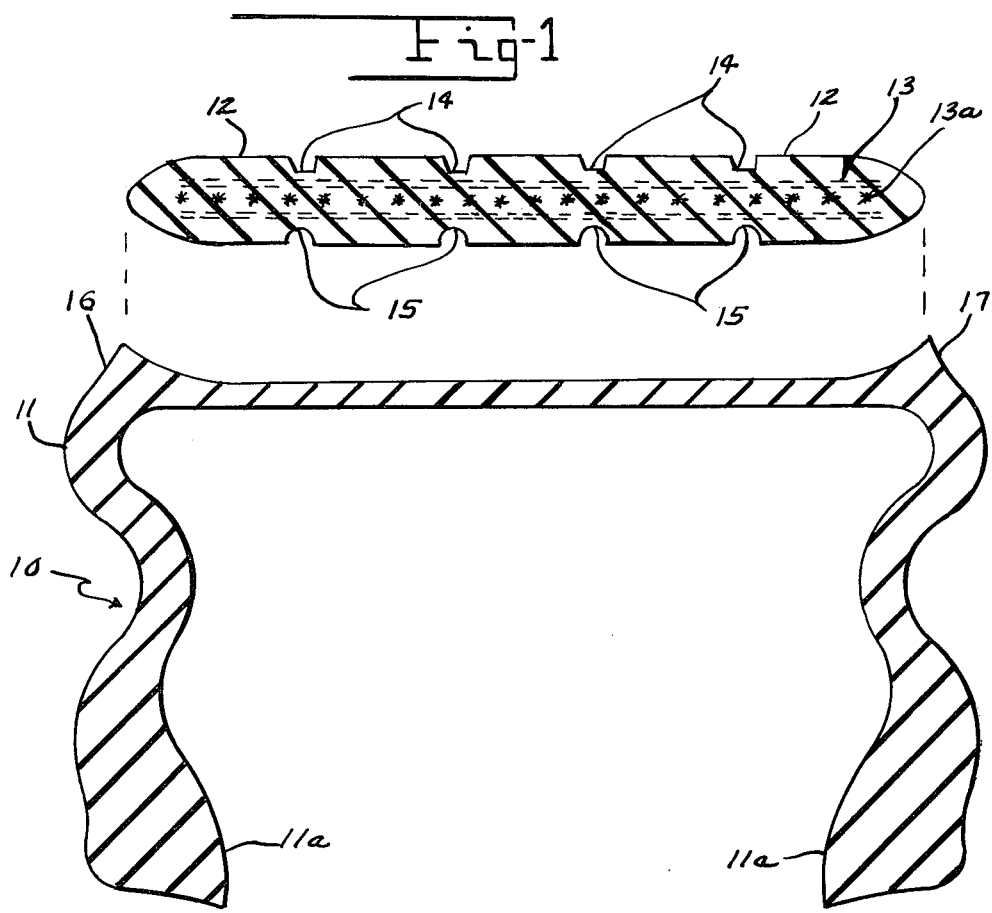

Referring generally to the drawings and, in particular, to FIGS. 1 and 2 thereof, a tubeless pneumatic tire is indicated generally at 10 as consisting of an expandable or inflatable tire carcass 11 having the usual bead portions, as at 11a, for airtight engagement, when the tire carcass 11 is inflated as in the aforementioned FIG. 2, against the rim of a wheel (not shown), and, in a novel combination therewith, the unique reversible, replaceable tire tread belt, indicated at 12, taught by the present invention. When it is desired to install or replace the inventive tire tread belt 12, its tire carcass 11 is deflated, as illustrated in FIG. 1, and the said tire tread belt, which is of an elastic configuration, though largely non-expandable due to its use of the reinforcement and retainer plys, indicated generally at 13 and 13a, is placed in a proper position directly over the carcass 11, as is clearly illustrated. Of course, where a replacement tread belt is desired, the old tread belt is first removed and then replaced by a new one. Thereafter, as is the conventional practice, the tire carcass 11 is inflated to thereby expand radially outwardly for a firm, non-slipping contacting engagement against the inside surface of the tread belt 12, as is clearly depicted in FIG. 2. A representative example of the replaceable tread tire exhibiting the foregoing action may be seen in the previously-referred to U.S. Pat. No. 3,578,052, issued to A. V. Petersons on May 11, 1971.

In accordance with the unique teachings of the present invention, the above-referred to tire tread belt 12 is improved over more conventional replaceable tread tires in current vogue, which most generally have only one side of the tread belt used as a wearing surface, by molding different tread patterns on both the inside and outside surfaces of the tire tread belt 12. In this regard, although the broad concept of using two tread surfaces on a replaceable tread belt is disclosed in FIG. 5 of the already mentioned U.S. Pat. No. 1,897,974, issued to G. Wolf on Feb. 14, 1933, it is again to be emphasized that the present invention constitutes a still further improvement over the conventional replaceable tread belt by not only incorporating more than one tread surface but, in addition thereto and as indicated hereinabove, incorporating two different tread patterns, as is exemplified and represented by the reference numerals at 14 and 15 in FIGS. 1 and 2 respectively for the outside and inside surfaces thereof.

With the use of two different tread patterns, as at 14 and 15, on the inventive tread belt 12 being molded to the outside and inside surfaces thereof as noted hereinbefore, as for example by means of a segmented mold to impart the different tread patterns during curing, conventional tire tread compounds, fabric tread reinforcements, breakers and/or retainer plys can be used. Naturally, with the use of the unique double and differently treaded, tread belt 12 of the present invention, not only does the present arrangement generally have the inherent advantage of offering increased tread life, as in the case of the tread belt taught in the aforementioned U.S. Pat. No. 1,897,974, but, in addition, by reversing the present tread belt 12 from the outer to the inner surface thereof or vice versa to bring one or the other of the different tread patterns, as exemplified at 14 or 15 (FIGS. 1 and 2) into ground contact, the particular tread surface that is most or best suited to the particular ground surface and/or prevailing weather conditions may be thereby quickly utilized.

Figures 3, 4:
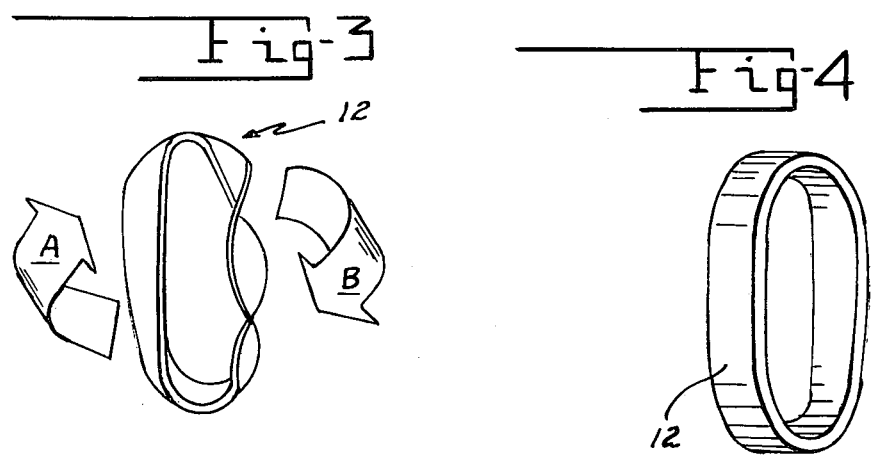

With specific reference to FIGS. 3–6, inclusive, the quickness with which a tire change can be accomplished in a matter of minutes to bring the present invention into operation may be initiated by, of course, deflating and thus contracting the expandable tire carcass, as at 11 in FIG. 1, and thereafter removing and reversing the reversible, replaceable tire tread belt 12, as seen in the first step of FIG. 3, with the reversing or turning inside out thereof being further schematically depicted by the arrows at A and B. Next, the now-reversed thread belt 12, seen in perspective and cross-section in FIGS. 4 and 4a, is positioned directly over the shoulder ridges 16 and 17 of the tire carcass 11, as is indicated in FIG. 5. Finally, the tire carcass 11 is reinflated to contact and grip the inside surface of the tread 12, as is clearly disclosed in FIG. 6. A portion of a wheel on which the inventive tire may be mounted is shown schematically at 18 in both FIGS. 5 and 6 with the tire bead portions held firmly against the wheel rim 18a. It is noted that the present reversible, replaceable tire belt 12 of the present invention can be mounted on any expandable type pneumatic tire carcass regardless of the ply orientation or specific cross-section.

Thus, a new and improved all purpose, all-weather, replaceable tread belt-pneumatic carcass tire has been developed by the present invention whereby there is ensured the dual advantages of the simple and quick replacement of a worn-out or damaged tread and the relatively easy reversal of the tread belt to one or the other of its different tread patterns for placing on the ground the tread best suited for the particular ground surface or the prevailing weather conditions.

With the use of the inventive tread belt, the need for carrying spare tire bands on-board for specifically providing for their use on both rough and paved fields, for example, in the case of aircraft, is eliminated or, at least, substantially reduced, as is the requirement for providing for separate tires both for conventional and bad weather use, such as in snow or rain. This, then, substantially reduces the procurement and thus cost of new tires, retreads or new bands, and the storage space and transportation and maintenance costs that are normally associated with conventional tires would likewise be greatly reduced by the use of the inventive tread belt.

We claim:

1. In a vehicle and/or aircraft tire; an inflatable pneumatic tire carcass adjustable between first, deflated and second, inflated positions, and incorporating a relatively elongated, tire tread-receiving channel terminating in oppositely-disposed, and arcuate-shaped ridges extending upwardly of the said channel; and a relatively enlarged, reversible, replaceable tread belt initially mountable directly over, and in a somewhat spaced relation relative to, the tire carcass when the latter is in its first, deflated position, and having oppositely-disposed outside and inside surfaces made of a relatively enlarged and specific configuration to subsequently precisely accommodate and exactly interfit in a relatively tight-fitting and non-slipping engagement the said tire tread-receiving channel of, and further terminating in opposite ovate-shaped, side-end portions engageable in a snug-fit and substantially streamlined relation to, and still further forming a natural extension from said oppositely-disposed, ridges of said tire carcass when the latter is in its second, inflated position; said tread belt further having a separate and differently configured-tread pattern respectively molded on the said outside and inside surfaces thereof to thereby enable the selective positioning of the particular tread pattern on the ground that is best suited for the specific ground surface or prevailing weather conditions, by the relatively quick manual reversal of said tread belt on said tire carcass to a pre-selected position.

* * * * *